R. W. BARTON.
PROPELLER CONTROLLING MECHANISM.
APPLICATION FILED SEPT. 28, 1918.

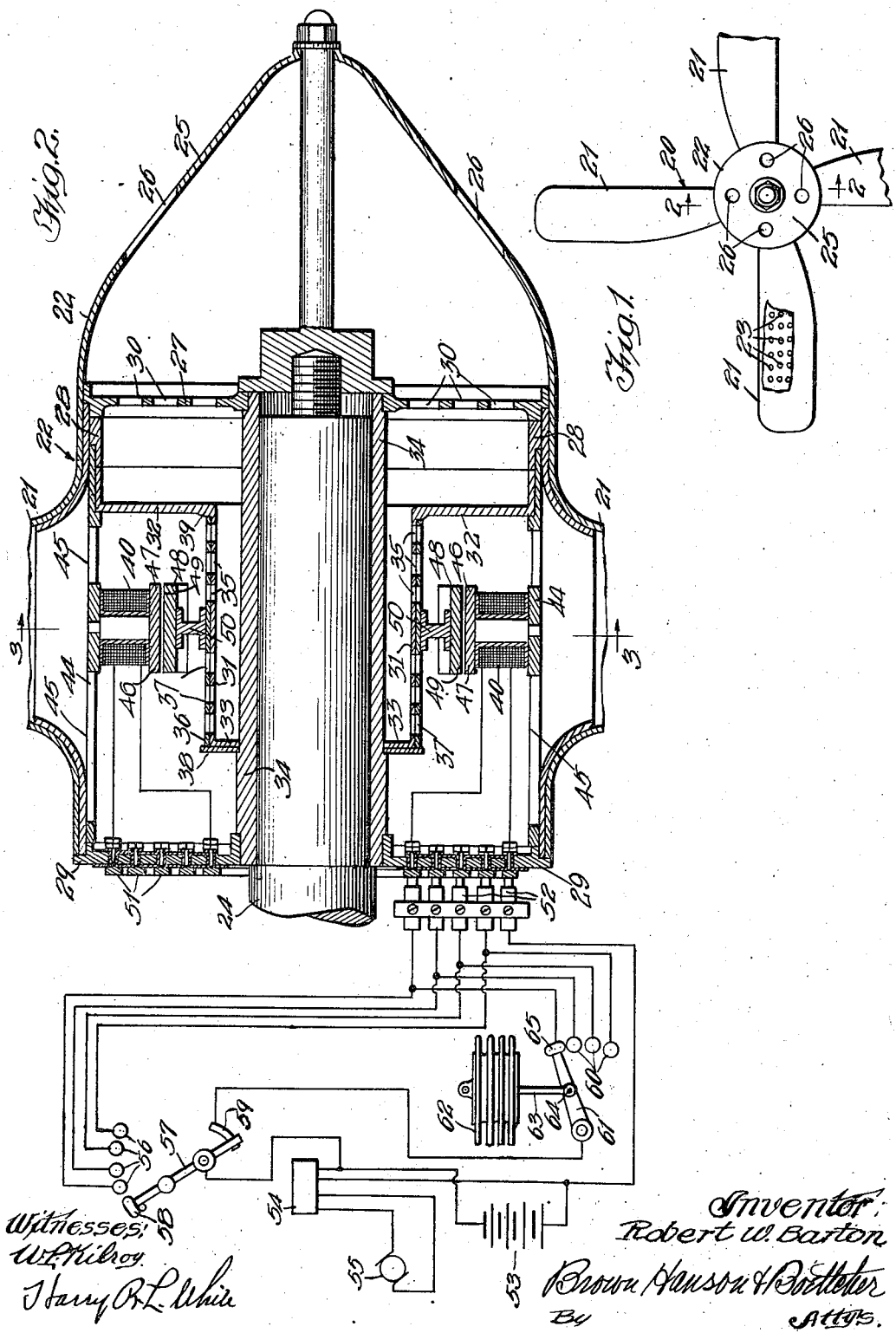

1,420,619.

Patented June 27, 1922.
6 SHEETS—SHEET 4.

Witnesses:
W. P. Kilroy
Harry R. L. White

Inventor:
Robert W. Barton,
By Brown, Hanson & Boettcher
Attys.

R. W. BARTON.
PROPELLER CONTROLLING MECHANISM.
APPLICATION FILED SEPT. 28, 1918.
1,420,619.
Patented June 27, 1922.
6 SHEETS—SHEET 5.
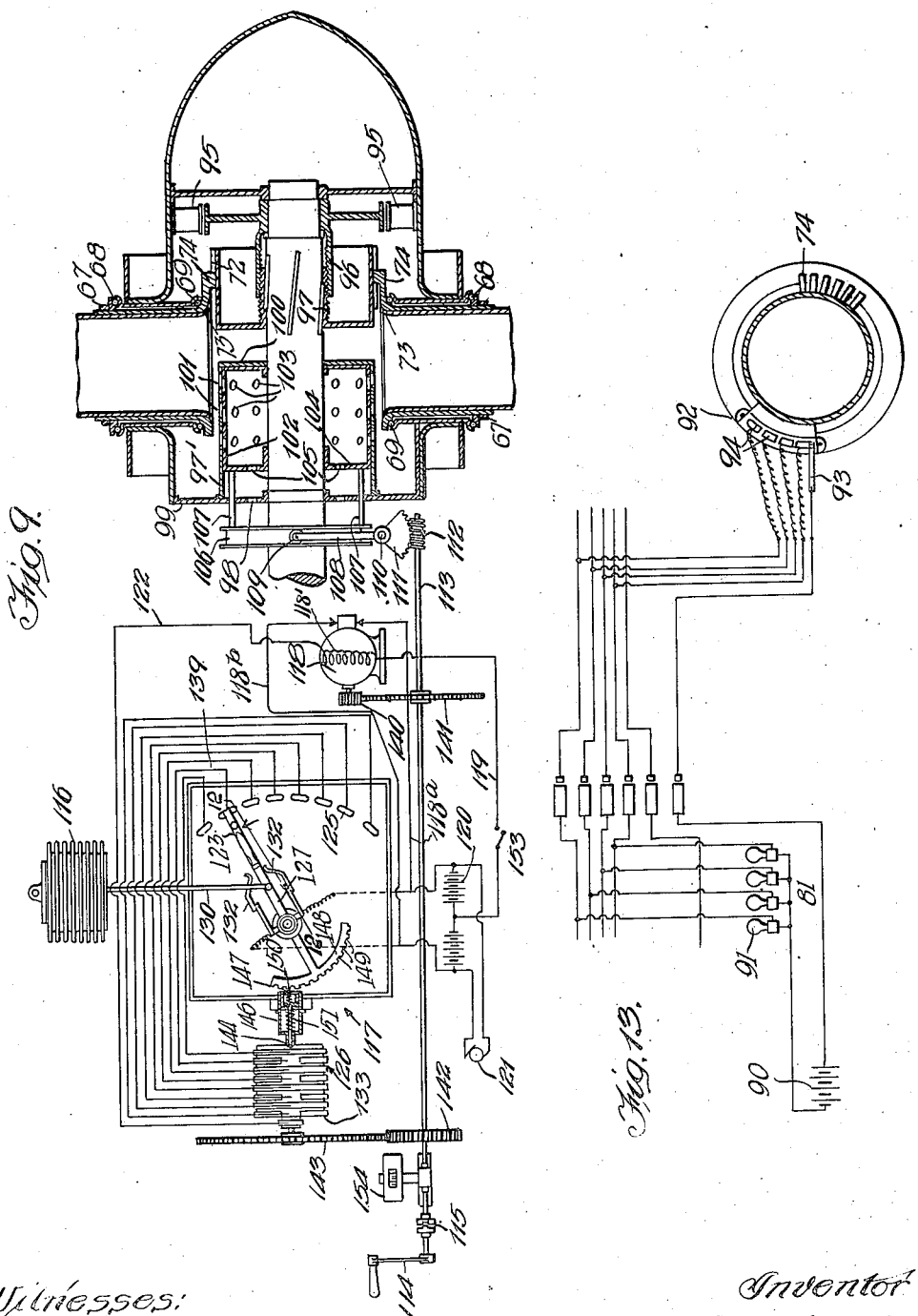

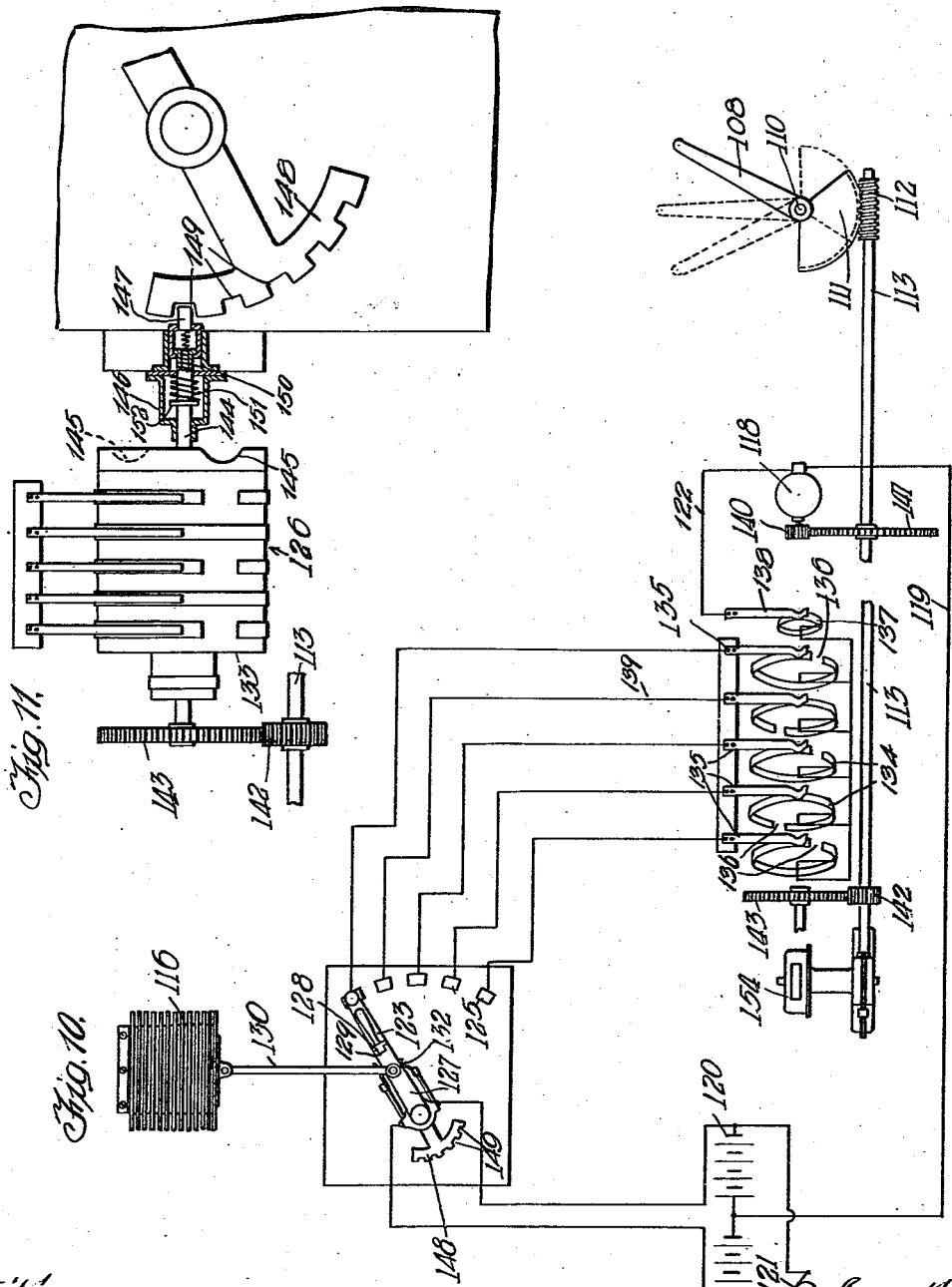

UNITED STATES PATENT OFFICE.

ROBERT W. BARTON, OF CHICAGO, ILLINOIS.

PROPELLER-CONTROLLING MECHANISM.

1,420,619. Specification of Letters Patent. Patented June 27, 1922.

Application filed September 28, 1918. Serial No. 256,026.

*To all whom it may concern:*

Be it known that I, ROBERT W. BARTON, a citizen of the United States, residing at Chicago, in the county of Cook and State of Illinois, have invented certain new and useful Improvements in Propeller-Controlling Mechanism, of which the following is a specification.

My invention relates to flying machines and the like, and has to do especially with improved means for controlling the operation of the propellers of such craft.

It has been proposed to control the power absorbed and conversely the work done by such propellers by changing the angle or pitch of the blades of the propellers and by permitting a controlled quantity of air to travel out the blades and be ejected at the backs of the blades to reduce the vacuum at the backs of the blades when the propeller is running, or by combinations of these two means.

By means of my invention I control the angular position or pitch of the blades and I can also control the flow of air out the blades from the hub by novel, mechanical and electrical means and devices and by means of my invention I am enabled to effect the control, either manually or automatically, and to control them automatically in accordance with the altitude of the machine, or in other words, in accordance with the height above sea level.

I also arrange my controlling devices so that if the same are operating automatically in accordance with the height of the machine or the barometric pressure, I can readily and easily disconnect the automatic control and effect the control manually to meet sudden emergencies or to accomplish specific objects, or I can as readily change from manual to automatic or power control.

In accordance with my invention I use electricity as the prime mover, controlling its application to effect the angle of the blade or the flow of air or both, either manually or automatically. I also provide indicator means whereby the operator can know the angle or pitch of the blades at any instant and can set them at any desired or predetermined angle, and can also know the quantity of air being discharged by the blades.

My invention will be more readily understood by reference to the accompanying drawings forming a part of this specification, and in which:

Figure 1 is a fragmentary view in elevation of a propeller made in accordance with my invention;

Figure 2 is a fragmentary vertical central sectional view substantially on the line 2—2 of Figure 1 combined with a diagrammatic view of the electric circuits and devices which I employ to control the flow of air through the hub to the several arms;

Figure 9 is a view similar to Figure 2, illustrating a propeller in which I have combined both the rotation of the propeller arm and the control of the flow of air through the hub to the arms;

Figure 10 is a diagrammatic illustrative view of the electric circuits and apparatus shown in Figure 9;

Figure 11 is an enlarged fragmentary view in elevation, shown partly in section, of part of the control mechanism shown in Figure 9;

Figure 13 is a diagrammatic view clearly illustrating the circuits and connections for operating the indicator for showing the angle of the blades.

Figure 3:
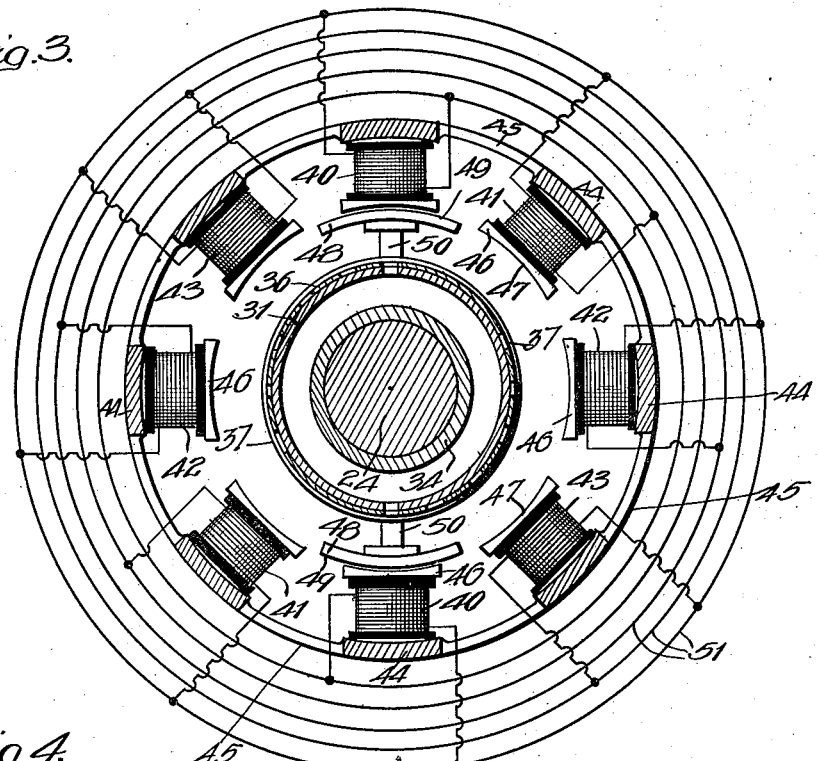
Figure 3 is a detailed vertical sectional view substantially on the line 3—3 of Figure 2, particularly illustrating the electric rotor which I employ to control the flow of air to the arm, combined with a diagrammatic view of the contact rings and electric connecting circuit for the several magnets employed.
Figure 4:
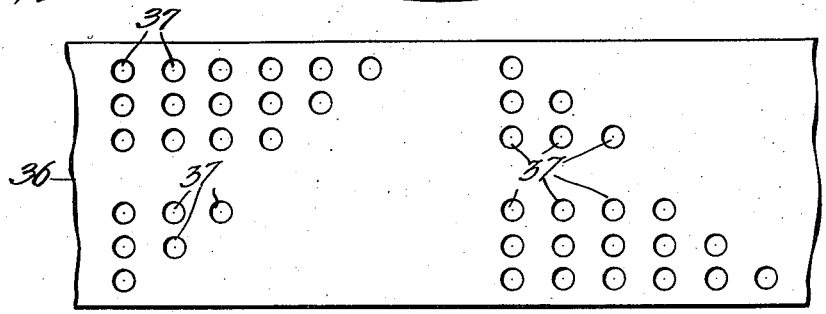
Figures 4 and 5 are developed plan views of the perforated air controlling valve cylinders shown in Figure 2.
Figure 5:
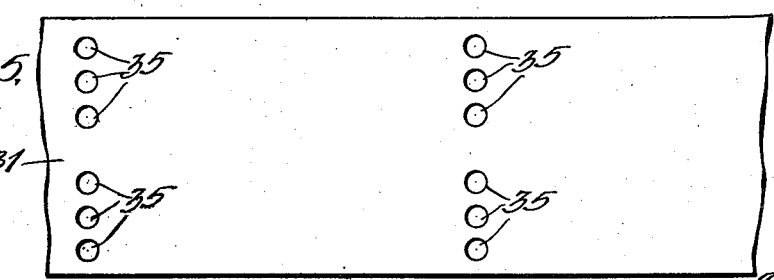

In said drawings I have illustrated a propeller wheel 20, Figure 1, made in accordance with my invention and suitable for driving airplanes and other flying machines. I have shown the wheel 20 as having four arms or blades 21, but it should be understood that the number of arms may be two or four or any other suitable number. The arms project radially from a relatively large hub 22. The arms are preferably hollow and are provided in their rear walls or sides with air outlet openings 23, Figure 1, through which air can escape and thus affect or reduce the vacuum which is created when the propeller is rotating at a sufficiently high speed to be effective. The propeller is mounted on a shaft 24 and is secured thereon to rotate therewith in any suitable manner. The hub is provided at its forward end with a tapered hood 25, Figure 2, in which I provide air admission openings 26 of a sufficient number and size to admit air to control the vacuum at the backs of the blades as desired.

In the form of my propeller shown in Figure 2 I provide a transverse wall 27 at the forward end of the hub for supporting the shell 28 of the hub, and a second wall 29 at the rear end of the hub. I provide a plurality of openings 30 in the wall 27 for the passage of air from the hood 25 to the hub proper.

Within the hub proper I provide a cylindrical valve for controlling the flow of air to the hollow arms 21. This valve comprises a relatively fixed cylindrical shell 31 axially in alignment with the shaft 24. I connect the forward end of the shell with the shell 28 of the hub by an imperforate wall 32 and I close the rear end of this shell by the wall 33 by which I mount the shell upon the hub sleeve 34 of the propeller.

I perforate the cylindrical wall of this sleeve 31 with two parallel rows of holes 35 which extend longitudinally of the shell. I arrange the two rows at diametrically opposite points and preferably each row may consist of six holes.

Mounted on the outer cylindrical surface of this sleeve 31 I mount a valve sleeve 36 co-extensive with the sleeve 31 and adapted to rotate thereon. I provide this outer cylindrical sleeve 36 with two sets of rows of holes 37 arranged diametrically opposite to each other and adapted to register with holes in the inner cylinder. I preferably provide six rows of holes in each set varying, as shown, from six holes to one hole, and I further provide a space without any holes so that I can stop all flow of air from the hub to the arms or adjust the cylinders to permit any desired quantity of air to flow. I hold the cylinder 36 against longitudinal movement by any suitable means, as the circumferential shoulders 38 and 39.

To rotate the cylinder 36 relatively to the cylinder 31 and to hold it in its adjusted position for the purpose of controlling the flow of air to the arms, I preferably provide electrical devices, which can be controlled and manipulated from a distance.

This electrical control, as illustrated in Figures 2 and 3, comprises a circumferential row or ring of electro-magnets 40, 40, 41, 41, 42, 42 and 43, 43. The magnets of like numbers are arranged diametrically opposite to each other and the several magnets, as best shown in Figure 3, are uniformly spaced around the cylindrical valve. I mount these magnets on an outer cylindrical shell 44 carried by the hub and forming part thereof, this shell having openings 45 through which the air can flow to the hollow arms 21. Each of the magnets is provided, on its inner end, with a head 46 having a cylindrical inner face 47, and I provide a pair of diametrically disposed circumferentially elongated soft iron armatures or keepers 48, 48 having like or complementary cylindrical outer surfaces 49. I mount the armature 48 on the cylinder 36 by means of radial posts or connectors 50 so that they are adapted, as the cylinder is rotated, to sweep around in close proximity to the cylindrical surfaces of the heads 46.

When the propeller is running, at least one pair of the magnets is energized and this serves to hold the armatures 48 and consequently the outer valve sleeve 36 in its set position. To rotate the cylinder 36 to adjust the flow of air, the cylinder being in the position shown in Figure 3, wherein the greatest quantity of air is flowing, the magnets 40 being energized to retain the cylinder in such position, I energize the next pair of magnets 41, leaving the magnets 40 also energized. This serves to draw the armatures 48 to a position where they lie midway between the magnets 40 and 41 and this rotates the cylinder 36 through 22½° or ¼ of half a revolution, sufficient with my spacing of the rows of holes 37 on the cylinder to cause the second or five hole row to register with the rows 35 of holes in the cylinder 31, to thus reduce the valve area by ⅙.

If I desire further to reduce the flow of air I cut off the current from the magnets 40 leaving the magnets 41 energized and this serves to rotate the cylinder another step to set the armature 48 centrally to the magnets 41. When this occurs, the third row of holes 37 which contains but four holes is brought into register with the holes 35. Thus, step by step I can reduce the flow of air through the hub and by finally energizing the magnets 43 I rotate the cylinder 36 far enough to present a blank space over the holes 35 and I thereby close the valve entirely and stop all flow of air through the hub.

For the purpose of energizing the electromagnets I provide a plurality of insulated contact rings 51 on the rear end of the hub, the outer ring being connected to each of the magnets, as best shown in Figure 3, and serving as part of the return circuit and opposite pairs of magnets being successively connected to the other rings beginning with the inner ring which is connected to the two magnets No. 40, the second one on the inside is connected to the magnets 41 and so on in order toward the outer ring.

I provide a set of stationary contact brushes 52 for connecting with the contact rings 51, the outer brush connected with one side of a source of electricity, as for instance, a battery 53 or through a reverse current relay device 54 with a dynamo 55, this connection serving for the return circuit. The other brushes are connected in serial order to a number of terminal contacts 56 which are adapted to be put in circuit by the hand lever 57. The lever is electrically connected with the opposite side of the battery or source of electricity. I provide the lever 57 with a wide circuit closing contact 58 at one end adapted as the lever is swung around to first make contact with the first terminal 56, thus energizing the first pair of magnets 40, then as it is swung farther to make contact with the first and second contacts 56 thus energizing the magnets 40 and 41, as hereinbefore described. When the lever 57 is in its normal position, it is out of contact with any of the terminals 56, and the opposite end of the lever contacts at such time with a plate 59 by which I supply current to an automatic control, which I will now describe. It should be understood however that the first movement of the hand lever opens the automatic control circuit by the lever 57 leaving the contact plate 59 thus throwing the automatic control out of operation when the device is operated by hand.

As shown in Figure 2, each of the four inner brushes 52 are connected in series to four terminals 60. I provide a switch lever 61 connected to the contact plate 59 and through the lever 57 to the source of electricity. I provide a bellows device 62 which is made up of thin sheet metal and hermetically sealed at substantially sea level and I connect this device with the lever 61 by rod 63 pivotally connected to the lever 61 at 64. The bellows device 62 is adapted to expand when the atmospheric pressure decreases, as by being taken to a higher altitude on a flying machine and when it expands it causes the lever 61 to swing around thus sweeping the contact plate 65 on the free end of the lever 61 over the contacts or terminals 60 and successively energizing pairs of magnets in the hub of the propeller. Normally at sea level the lever 61 contacts with the terminal 60 which is connected with the magnets 40 and thus tends to hold the cylinder 36 in the position shown in Figure 2 with all six holes 31 open. The contact plate 65, like the one on the end of the lever 57, is wide enough to contact with two of the terminals 60 at once, and consequently as the lever 61 is swung it operates to energize the magnets in succession and in the manner hereinbefore described.

An emergency might arise when the operator would want to close the valve, the automatic device holding it partly open at the time, or he might for some reason want to quickly open the valve, the automatic device at the time holding it partly open. By means of the hand lever the operator can manually set the valve at any point he desires, and, as explained, the first movement of the hand lever disconnects the automatic so that there is no interference between the two.

Figure 6:
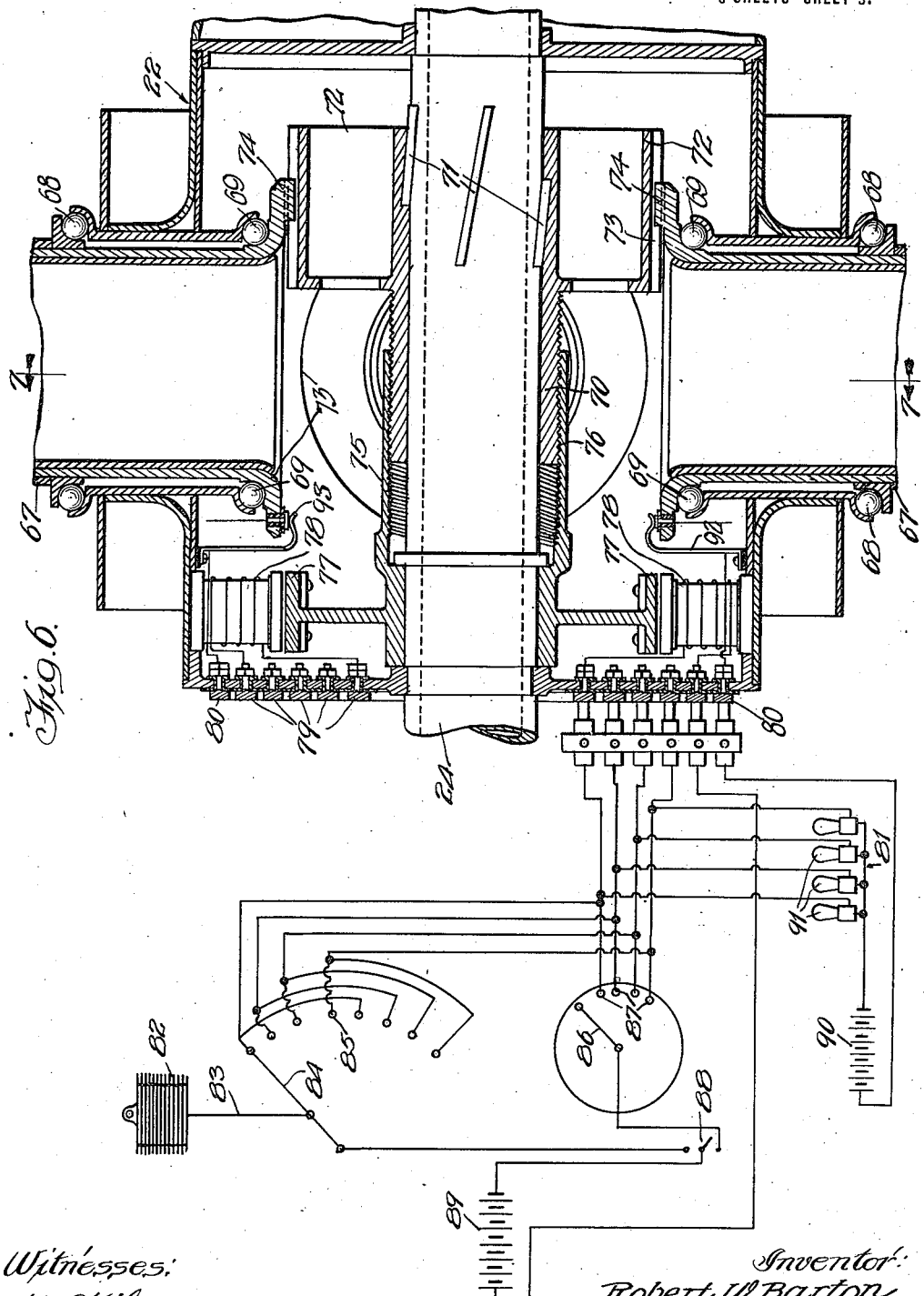
Figure 6 is a view similar to Figure 2, particularly illustrating the means I employ for changing the angle or pitch of the propeller arms.
Figure 7:
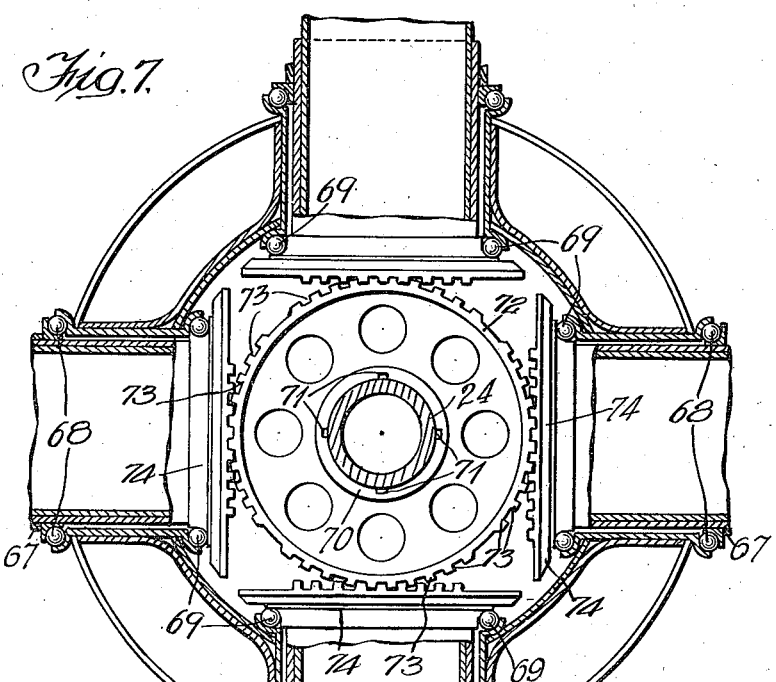
Figure 7 is a fragmentary vertical sectional view substantially on the line 7—7 of Figure 6.
Figure 8:
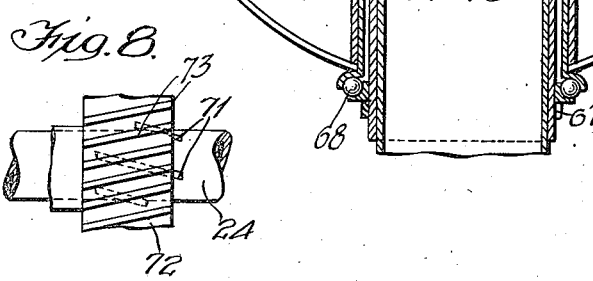
Figure 8 is a fragmentary plan view of the arm rotating gear shown in Figure 7.

In Figures 6, 7 and 8 I have shown the application of the same electromagnetic control devised for rotating the arms for changing the angle of the arms, or in other words the pitch of the blades or wheel, for the purpose of controlling the operation of the wheel.

In this form I provide the arms or blades 67 which are mounted for turning on their radial axes. I mount them for this purpose on outer ball bearings 68 and inner ball bearings 69. Upon the propeller shaft 24 within the propeller hub I mount a longitudinally slidable sleeve 70. I provide means, to be described, for sliding this sleeve along the shaft, and I provide inclined keys or splines 71 on the shaft so that when the sleeve is moved along the shaft 24 it will also be rotated to some extent. On the forward end of the sleeve I provide a segmental gear 72, in the instance shown, having four sets of teeth 73 each adapted for engagement with a segmental face gear 74 on the inner end of one of the arms 67. I make the face of the gear 72 relatively wide so that it can slide along the shaft 24 and yet the teeth will mesh with the gears 74. The rotation of the sleeve 70 on the propeller shaft due to the inclined splines 71 causes the blades to rotate. To increase the amount of this rotation I make the teeth of the segmental gear 73 inclined in the opposite direction to the inclination of the splines, as best shown in Figure 8. Consequently, as the teeth of the gear 72 slide through the teeth of the face gear 74, the blades are rotated by an additional amount measured by the angularity of these teeth.

To slide the sleeve 70 and to hold it stationary against the great pressure which is transmitted to the sleeve from the blades through the gears, I provide a sleeve 75 rotatably mounted on the shaft and held in any suitable manner against longitudinal movement thereon. The sleeve 75 is engaged with the sleeve 70 by a screw thread engagement, the sleeve 75 being internally threaded and the sleeve 70 externally threaded for this purpose, as shown at 76. I mount a pair of soft iron armatures 77 similar to the armatures 49 already described in reference to Figure 3, on the sleeve 75, and I provide a ring of electromagnets 78 arranged to co-operate with the armatures 77 to rotate the sleeve 75. The electromagnets 78 are arranged similar to the ring of magnets shown in Figure 3, and are operated in a similar manner. In this instance I provide five insulated contact rings 79 on the rear end of the hub, as in the former instance, for successively energizing the pairs of magnets to rotate the sleeve 75, and I provide a sixth ring 80 which I use to operate a visual signal 81 so that the operator can, at a glance, see the angle at which the blades are set. It should be understood that the electric circuit and devices shown are merely typical embodiments of my invention.

I have illustrated an automatic bellows barometric device 82 connected by a rod 83 to a switch lever 84. This lever is shown as sweeping over a double set of terminals 85 connected to the four magnet circuits. It is obvious that the terminals 85 might and probably would be duplicated many times so that the sleeve 75 would be rotated a sufficient number of times to effect the change in angularity of blades desired, and in order to avoid confusion I arrange the visual signal 81 so that the operator will be advised at all times of the angularity of the blades.

I arrange a hand lever switch 86 adapted to contact with terminals 87 of the magnet circuits, and I arrange a switch 88 to connect the automatic switch 84 to the source of electricity 89 or alternately to connect the hand lever 86 to said source so that only one of these levers is operable at one time. It should be understood that the terminals 87 will be duplicated around the circle so as to give a powerful control over the sleeve 75.

The sixth contact ring 80 is connected to a second or auxiliary battery 90 and connected to the positive end thereof. The other terminal of the battery is connected to the several lamps 91 of the visual signal 81 and the opposite terminal of each lamp is connected respectively to one of the magnet circuits as clearly shown.

Upon the base of each blade and opposite to the teeth on the gear 73 I arrange a series of insulated contacts 92 preferably providing four thereof and arranged in such relation to the normal angle of the blade that I can indicate the variation of the position of the blades to the normal angle, which is preferably about 40° to a plane at right angles to the axis of the propeller. This is best illustrated in Figure 13. I provide an insulated contact spring 93 connected with the contact ring 80 and I preferably connect the four contacts 94 of the indicating device 92 with the four inner rings which are connected to the four pairs of magnets. By this means I am enabled to make use of the four inner rings and their contact brushes as parts of the visual indicating circuit, as well as the magnet energizing circuit, and thus reduce the number of rings 79 and contact brushes to a minimum, making use of a portion of the magnet circuits in the several visual indicating circuits.

The operation is as follows:

Assuming that the lever 84 is in contact with the first terminal, as shown in Figure 6, the inner ring 79 will be connected with the source of electricity and the first pair of magnets will be energized, and at such time we will presume that the blades are in their normal operative position arranged at 40°. At such time the spring contact 93 will be in contact with the 40° insulated terminal 94 and the current from the battery 90 will pass back through one of the magnet circuits to the lamp marked 40, thus lighting the lamp and indicating to the operator that the arms are arranged at 40°.

It should be understood that the operation of the visual signal is entirely independent of the magnet circuit except that portion of the magnet circuit used for entering the hub.

It should be understood that if it is desired to give the blades a minus pitch or a reverse pitch, the contacts 94 can be duplicated upon the other side to indicate the negative or reverse angle in the same way that the positive angles are indicated.

In Figures 9 to 12 inclusive, I have illustrated means which I have devised for combining the adjustment of the pitch or angle of the blade with the control of the flow of air through the hub to the hollow blades.

I have therein merely indicated the angular blade control by the gears 72 and 74 and a ring of magnets 95 arranged in the forward end of the hub and adapted to rotate a sleeve 96 engaging the hub 97 and the gears 73, similar to the like parts shown in Figure 6. It should be understood that the circuits to operate the magnets 95 in this instance are the same as in the former instance.

To control the flow of air through the hub I provide a rigid cylindrical shell 97' arranged in the rear part of the hub of the propeller and concentric with the axis thereof. I provide openings 98 in the rear wall 99 of the hub within the cylinder 97' through which the outer air can enter. I close the inner end of the shell 97' by the wall 100 and I provide a series of openings 101 in the cylindrical wall of the shell to permit the air to flow from the interior of the shell 97' to the arms. For controlling the flow of air I provide a cylindrical valve 102 arranged to slide within the shell 97' and provided in its cylindrical wall with openings 103 adapted to register with the holes 101 to permit air to flow, or to be moved out of register therewith to stop the flow of air. The rear wall 104 of the valve 102 is provided with openings 105 to permit the air to enter within the valve cylinder 102.

I provide both automatic and manual means for moving the valve cylinder endwise.

I provide a grooved ring 106 slidably mounted on the propeller shaft 24 and rigidly connected with the valve cylinder 102 by the rods 107. I provide a swinging lever 108 having ends 109 engaged in the grooved ring 106 and pivotally mounted at 110 to swing back and forth. I provide a toothed quadrant 111 on the opposite end of the lever 108 engaged by a worm 112 mounted on the shaft 113. It will be obvious that by rotating the shaft 113, the valve cylinder 102 can be adjusted, and that the valve will be held rigidly in its adjusted position by the worm 112. To rotate the shaft 113 manually, I provide a crank handle 114 adapted to be clutched to the shaft 113 by the toothed clutch 115 or to be separated therefrom in an obvious manner.

To rotate the shaft 113 automatically I provide a bellows barometric device 116 which is adapted to be lengthened by a decrease in the air pressure and to be shortened by an increase in the air pressure.

I connect this device to an electric current control mechanism 117 by which I am enabled to rotate the shaft 113 in either direction, as may be necessary to decrease or increase the flow of air through the hub to the arms.

This electrical mechanism includes an electric motor 118, the armature of which is connected by circuit wires 118ª and 118ᵇ to the lead wires from the ends of a battery 120. A dynamo 121 may be provided to maintain the battery charged.

Figure 12:
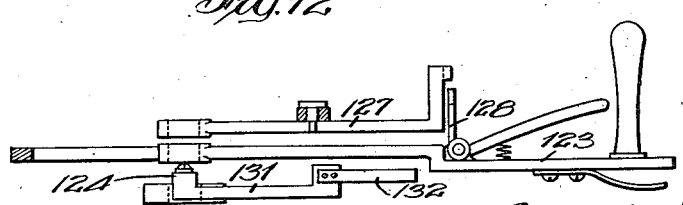
Figure 12 is a detail sectional view of the switch lever mechanism shown in Figures 9 and 10, substantially on the line 12—12 Figure 9, the several associated parts being separated to best disclose the construction.

For controlling the supply of current to the motor I provide a switch lever 123, see Figure 12, pivotally mounted at 124 to swing and adapted to sweep over a series of terminals 125, Figure 9. The terminals 125 are connected through a controlling device 126 to the conductor 122. The lever 123 is associated with a swinging lever or arm 127, see Figure 12, also pivoted at 124 and adapted to be locked to the lever 123 to swing with same by the spring-held latch 128 which is carried by the lever 123 and which engages in a notch 129 in the outer end of the lever 127. I connect the lever 127 between its ends to the bellows device 116 by a link or rod 130 so that as the bellows device 116 changes in length due to the variation in altitude of the flying machine, the lever 127 and the switch lever 123 when locked thereto will be swung on the pivot 124.

I provide a third member 131 also pivotally mounted at 124 and carrying two insulated spring contacts 132 electrically connected to respective ends of the battery 120.

The member 131 is not connected to the levers 127 and 123 to rotate with same, but the spring contacts 132 are arranged one at each side of the lever 123 and in the path of same and they are adapted to alternately contact with the lever 123, depending upon the direction in which the lever 123 is being moved. As the lever 123 moves up it contacts with one of the spring contacts, and as it moves down, it contacts with the opposite one, but they are separated far enough apart so that the lever cannot contact with both at the same time.

The controlling device 126, as best shown in Figures 9 and 10, comprises an insulated barrel or cylinder 133 mounted to rotate on its axis and provided with a series of conducting rings 134 mounted thereon electrically connected by contact brushes 135 to the several terminals 125 in serial order. Each of the rings 134 is provided with a gap 136 and the gaps in adjacent rings are diametrically opposite to each other. At one end, the cylinder 133 carries a continuous contact ring 137 which is connected within the cylinder to all of the rings 134 and is connected by a contact brush 138 with the conductor 122.

The arrangement is such that when the bellows device changes its length, sufficiently, it moves the lever 123. We will presume that the lever has been in contact with the first or higher terminal of the series 125. The lever swinging down contacts with the second terminal of the series 125. It will also contact with the lower terminal 132, thus completing the circuit from the negative end of the battery through the connector 139 with the second ring from the right as shown in Figure 10, which ring is connected by its brush 135 and through the ring 137 with the motor 118. The motor 118 is connected by gears 140 and 141 with the shaft 113 and the controller 133 is also geared to the shaft 113 by gears 142 and 143, so that when the motor 118 runs, the controller 133 is rotated. Upon the closing of the circuit 139, as described, the controller 133 is rotated for a half revolution or until the gap 136 in the ring 135 being used comes around to the contact brush, thereupon the circuit is broken and the supply of current to the motor is cut off. A further movement of the arm 123 in the same direction will connect the arm with the next terminal 125 in order, thus connecting with the ring 136 next adjacent to the one which has just been used and the shaft 113 will again be rotated until the controller has again made a half revolution.

It is to be understood that each operation of the motor as described moves the valve cylinder 102 a proportionate distance. Upon movement of the arm 123 in the opposite direction from any position it may occupy, the first effect is to break contact with the spring contact 132 with which it had been in contact, and to make contact with the opposite spring contact 132, thus connecting with the opposite end of the battery so that when the arm 123 contacts with the next terminal 125, in its reverse movement, the motor 118 will be run in the opposite direction and thus move the valve cylinder 102 in the opposite direction.

To make sure that the control cylinder 133 remains at rest at the proper positions to set the contact brushes 135 on the gaps 136, I provide a yielding stop 144 and I provide the cylinder 133 with two diametrically oppositely disposed depressions 145 to receive the stop 144. These depressions are preferably in alignment with the two lines of gaps 136.

The stop 144 is mounted for longitudinal movement in a casing 146 and arranged so that its opposite end 147 projects into the path of the notched segment 148 which I provide on the rear end of the lever 123. This segment is provided on its periphery with notches 149 to receive said opposite end of the stop 144 when the same is moved longitudinally by the rotation of the cylinder 133, and it is held thus interlocked with the lever 123 until the cylinder 133 has made a half revolution and permitted the stop to enter the opposite depression 145. To prevent accident in case the segment should not be in position to let the stop enter one of the notches when the cylinder 133 starts to rotate, I make the stop yielding, the rear end 147 being arranged to telescope with the main part of the stop and held at the outward limit of its movement by a compression spring 150 within the stop. The stop itself is yieldingly held at one limit of its movement and in contact with the cylinder 133 by a compression spring 151 mounted within the casing 146 and engaging a collar 152 on the stop.

The necessity of the stop device is to prevent the inadvertent or automatic movement of the switch lever 123 once the cylinder 133 has started to rotate, until the cylinder has come to rest on the half revolution.

When it is desired to operate the valve by hand by means of the crank arm 114, the lever 123 is freed from the lever 127 so that the bellows 116 cannot control the mechanism, and I provide a hand switch 153 in any convenient position to break the return circuit so that as the cylinder 133 is rotated by hand, the motor 118 will not interfere with the rotation of the shaft 113.

I provide a visual indicator 154 geared to the shaft 113 and arranged to indicate the amount the valve 102 is opened. When the lever 123 is on the upper terminal 125 of the series, the valve is full open and when it is on the lowermost terminal of the series, the valve is fully closed, and the intermediate terminals are effective to position the valve in intermediate positions.

As it is obvious that many modifications of my invention will readily suggest themselves to those skilled in the art, I do not limit or confine my invention to the specific structures, circuits and devices herein shown and described except within the scope of the appended claims.

I claim:

1. The improvements herein described comprising a flying machine propeller, having an air passage through the hub thereof adapted to deliver air to the arms of the propeller, a valve in the hub for controlling the flow of air, and electromagnetic means for operating said valve from a distance while the propeller is running.

2. The improvements herein described comprising a flying machine propeller, having an air passage through the hub thereof adapted to deliver air to the arms of the propeller, a valve in the hub for controlling the flow of air, electromagnetic means within the hub for holding said valve in any adjusted position, and for adjusting the valve while the propeller is running, and means for controlling the operation of said electromagnetic means from a distance while the propeller is running.

3. The improvements herein described comprising a flying machine propeller, having an air passage through the hub thereof adapted to deliver air to the arms of the propeller, a cylindrical valve mounted for rotation within the hub, a ring of electromagnets surrounding the valve, armatures carried by the valve and means without the propeller for selectively energizing the electromagnets to move and to hold said valve.

4. In a propeller for use in air or like medium, means for controlling the vacuum at the backs of the propeller blades when the propeller is running, including a ring of electromagnets mounted in the hub of the propeller, a relatively rotatable valve member for affecting the propeller control, passages controlled by the valve member and leading to the backs of the propeller blades, armatures carried by the member subject to said electromagnets, and means for selectively energizing said magnets to cause said member to rotate relatively to the hub while the propeller is running.

5. In a flying machine having a propeller mounted on a hub, means within the hub for controlling the operation of the propeller, a barometric device on the flying machine and electrical means connecting the barometric device with the control means within the hub for automatically controlling the operation of the said control means in accordance with the atmospheric pressure.

6. The improvements in air propellers herein described comprising, means within the hub for controlling the power absorbed by the propeller when running, a ring of electromagnets within the hub for controlling said means, electric contact rings carried by the hub and connected with said electromagnets, a barometric device adapted to successively connect said rings to a source of electricity for selectively energizing said magnets.

7. The improvements herein described, comprising a flying machine propeller, means within the hub of the propeller for controlling the power absorbed by the propeller when running, a ring of electromagnets within the hub for controlling said means, electric contact rings carried by the hub and connected to said electromagnets, a barometric pressure device adapted to control the flow of electricity to said rings for selectively energizing said magnets, and means for manually controlling the flow of electricity to said rings.

8. The improvements herein described comprising a flying machine propeller, means within the hub of the propeller for controlling the power absorbed by the propeller, a ring of electromagnets within the hub for controlling said means, means for selectively energizing said electromagnets in accordance with the barometric pressure, manual means for selectively energizing said electromagnets and means for automatically cutting out the barometric control means when manual operation is employed.

9. The improvements herein described comprising a flying machine propeller, having an air passage through the hub through which air can be supplied to the arms, means in the hub for controlling the flow of air to the arms comprising a fixed cylinder, said cylinder having a plurality of longitudinal rows of holes in its cylindrical wall, a rotatable cylinder mounted upon the fixed cylinder, said rotatable cylinder having rows of holes for register with the holes in the fixed cylinder, opposed armatures carried by the rotatable cylinder, a ring of electromagnets surrounding the cylinder and adapted to operate upon said armatures and means for selectively energizing opposed magnets to adjust and to hold said cylinder.

10. In a propeller for a flying machine having a hollow hub and arms and passages therein through which air can flow from the hub to the arms, means within the hub for controlling the flow of air to the arms, comprising a fixed cylinder having rows of holes through which the air can pass, a rotatable cylinder on the fixed cylinder having rows of holes for register with the holes in the fixed cylinder, opposed armatures on the rotatable cylinder, a ring of electromagnets surrounding the cylinders and adapted to operate upon said armatures, means for selectively energizing opposed pairs of magnets to adjust and to hold said cylinder, said means including a barometric electric switch device for controlling the energizing of the magnets in accordance with the barometric pressure.

11. The improvements herein described comprising a flying machine propeller, means within the propeller for controlling the power absorbed by the propeller when running, a ring of electromagnets within the hub for controlling said means, means without the propeller for adjusting said controlling means, comprising a source of electric current connected to said magnets, a barometric control device interposed in said connection and adapted to selectively energize said magnets in accordance with the barometric pressure.

In witness whereof I hereunto subscribe my name this 21st day of Sept. A. D. 1918.

ROBERT W. BARTON.